(12) United States Patent
Mujtaba

(10) Patent No.: US 7,855,993 B2
(45) Date of Patent: *Dec. 21, 2010

(54) METHOD AND APPARATUS FOR REDUCING POWER FLUCTUATIONS DURING PREAMBLE TRAINING IN A MULTIPLE ANTENNA COMMUNICATION SYSTEM USING CYCLIC DELAYS

(75) Inventor: Syed A Mujtaba, Watchung, NJ (US)

(73) Assignee: Agere Systems Inc., Allentown, PA (US)

( * ) Notice: Subject to any disclaimer, the term of this patent is extended or adjusted under 35 U.S.C. 154(b) by 1043 days.

This patent is subject to a terminal disclaimer.

(21) Appl. No.: 11/507,389

(22) Filed: Aug. 21, 2006

(65) Prior Publication Data

US 2007/0097946 A1 May 3, 2007

Related U.S. Application Data

(60) Provisional application No. 60/711,025, filed on Aug. 23, 2005.

(51) Int. Cl.
*H04W 4/00* (2009.01)
(52) U.S. Cl. ...................... 370/334; 370/349
(58) Field of Classification Search ................. 370/334, 370/349
See application file for complete search history.

(56) References Cited

U.S. PATENT DOCUMENTS

| | | | |
|---|---|---|---|
| 7,310,304 B2 | 12/2007 | Mody et al. | |
| 7,366,250 B2 | 4/2008 | Mujtaba et al. | |
| 7,474,608 B2 | 1/2009 | Stephens et al. | |
| 2002/0154705 A1* | 10/2002 | Walton et al. | 375/267 |
| 2005/0226142 A1* | 10/2005 | Moorti et al. | 370/208 |
| 2005/0276347 A1 | 12/2005 | Mujtaba et al. | |
| 2006/0002487 A1 | 1/2006 | Kriedte et al. | |
| 2006/0182017 A1* | 8/2006 | Hansen et al. | 370/208 |
| 2006/0250943 A1 | 11/2006 | Mujtaba et al. | |
| 2006/0251183 A1* | 11/2006 | Soffer | 375/267 |
| 2006/0251193 A1 | 11/2006 | Kopmeiners et al. | |
| 2006/0274852 A1* | 12/2006 | Trachewsky et al. | 375/295 |
| 2007/0097946 A1 | 5/2007 | Mujtaba | |
| 2007/0104089 A1 | 5/2007 | Mujtaba | |
| 2007/0230431 A1 | 10/2007 | Driesen et al. | |

* cited by examiner

*Primary Examiner*—Barry W Taylor
(74) *Attorney, Agent, or Firm*—Ryan, Mason & Lewis, LLP

(57) ABSTRACT

Methods and apparatus are provided for reducing power fluctuations during preamble training in a multiple antenna communication system using cyclic delays. A preamble having a legacy portion and a high throughput portion is transmitted (or received) on each of N antennas, wherein at least a portion of the preamble on a first of the N antennas is delayed relative to at least the portion of the preamble on a second of the N antennas, wherein the delay is non-orthogonal amount to introduce variation across the preambles transmitted on the N transmit antennas. The legacy portion may be, for example, an 802.11 a/g preamble.

20 Claims, 17 Drawing Sheets

FIG. 10B $$\underbrace{\begin{bmatrix} H_1 & H_2 \\ H_3 & H_4 \end{bmatrix} \bullet \begin{pmatrix} \vec{l} & \vec{l} \\ \alpha\vec{l} & -\alpha\vec{l} \end{pmatrix}}_{\text{RECEIVED SIGNAL} \atop 1030} \square \underset{\underset{1040}{\text{INVERSE WALSH OPERATION} \atop \text{PERFORMED AT THE Rx}}}{\begin{pmatrix} 1/2 & 1/2 \\ 1/2 & -1/2 \end{pmatrix}} = \begin{bmatrix} H_1\vec{l} & \alpha H_2\vec{l} \\ H_3\vec{l} & \alpha H_4\vec{l} \end{bmatrix}$$

FIG. 10C $$\begin{pmatrix} z_1 \\ z_2 \end{pmatrix} = H_1\vec{l} = \begin{bmatrix} h_{11} & h_{12} \\ h_{21} & h_{22} \end{bmatrix} \bullet \begin{pmatrix} l_0 \\ l_{1600} \end{pmatrix}$$

$$h_{11}(t) = (z_1, l_0) \qquad h_{21}(t) = (z_2, l_0)$$
$$h_{12}(t) = (z_1, l_{1600}) \qquad h_{22}(t) = (z_2, l_{1600})$$

| HT-SIG 1 ||
|---|---|
| BIT NUMBERS | ASSIGNMENT |
| 0-11 | HT LENGTH |
| 12-16 | 32 MCSs |
| 17 | TBD |
| 18-23 | 6 TAIL BITS |

| HT-SIG 2 ||
|---|---|
| BIT NUMBERS | ASSIGNMENT |
| 0-17 | TBD |
| 18-23 | 6 TAIL BITS |

METHOD AND APPARATUS FOR REDUCING POWER FLUCTUATIONS DURING PREAMBLE TRAINING IN A MULTIPLE ANTENNA COMMUNICATION SYSTEM USING CYCLIC DELAYS

CROSS-REFERENCE TO RELATED APPLICATIONS

The present application claims priority to U.S. Provisional Patent Application Ser. No. 60/711,025, filed Aug. 23, 2005, and is related U.S. patent application Ser. No. 11/507,774, entitled "Method and Apparatus for Improved Long Preamble Formats in a Multiple Antenna Communication System," and U.S. patent application Ser. No. 11/507,390, entitled "Method And Apparatus For Improved Short Preamble Formats In A Multiple Antenna Communication System," each incorporated by reference herein.

FIELD OF THE INVENTION

The present invention relates generally to multiple antenna wireless communication systems, and more particularly, to preamble training techniques for a multiple antenna communication system.

BACKGROUND OF THE INVENTION

Multiple transmit and receive antennas have been proposed to provide both increased robustness and capacity in next generation Wireless Local Area Network (WLAN) systems. The increased robustness can be achieved through techniques that exploit the spatial diversity and additional gain introduced in a system with multiple antennas. The increased capacity can be achieved in multipath fading environments with bandwidth efficient Multiple Input Multiple Output (MIMO) techniques. A multiple antenna communication system increases the data rate in a given channel bandwidth by transmitting separate data streams on multiple transmit antennas. Each receiver receives a combination of these data streams on multiple receive antennas.

In order to properly receive the different data streams, receivers in a multiple antenna communication system must acquire the channel matrix through training. This is generally achieved by using a specific training symbol, or preamble, to perform synchronization and channel estimation. It is desirable for multiple antenna communication systems to co-exist with legacy single antenna communications systems (typically referred to as Single Input Single Output (SISO) systems). Thus, a legacy (single antenna) communications system must be able to interpret the preambles that are transmitted by multiple antenna communication systems. Most legacy Wireless Local Area Network systems based upon OFDM modulation comply with either the IEEE 802.11a or IEEE 802.11g standards (hereinafter "IEEE 802.11a/g"). Generally, the preamble signal seen by the legacy device should allow for accurate synchronization and channel estimation for the part of the packet that the legacy device needs to understand. Previous MIMO preamble formats have reused the legacy training preamble to reduce the overhead and improve efficiency. Generally, the proposed MIMO preamble formats, for example, in accordance with an IEEE 802.1 in standard, include the legacy training preamble and additional long training symbols, such that the extended MIMO preamble format includes at least one long training symbol for each transmit antenna or spatial stream.

A number of frame formats have been proposed for evolving multiple antenna communication systems, such as MIMO-OFDM systems. In one proposed MIMO frame format, each transmit antenna sequentially transmits one or more long training symbols, such that only one transmit antenna is active at a time. As the transmit antennas are switched on and off, however, the temperature of the corresponding power amplifier will increase and decrease, respectively. Generally, such heating and cooling of the power amplifier will lead to "breathing" effects that cause the transmitted signal to have a phase or magnitude offset, relative to the desired signal.

It is therefore desirable to have a continuous transmission from all transmit antennas to avoid temperature related signal "breathing." Thus, in further proposed MIMO frame formats, orthogonality is maintained using cyclic delay diversity (CDD), Walsh coding or tone interleaving across the different transmit antennas. The CDD short training symbol, however, cannot measure the received signal power with sufficient accuracy. Thus, additional backoff is required in the RF chain and additional dynamic range is required in the digitization process. Likewise, the tone interleaved design is not fully backwards compatible with a number of existing 802.11a/g devices that use short training for timing synchronization or use time domain channel estimation.

In a system that does not include legacy devices, or desires greater efficiency at the expense of losing backwards compatibility, the preamble does not need to include fields intended for legacy devices. Thus, a short preamble format has been suggested for reducing the overhead associated with the preamble in such environments. A need therefore exists for improved long and short MIMO preamble formats and training techniques that provide reduced preamble overhead.

SUMMARY OF THE INVENTION

Generally, methods and apparatus are provided for reducing power fluctuations during preamble training in a multiple antenna communication system having N antennas, using cyclic delays. According to one aspect of the invention, a preamble having a legacy portion and a high throughput portion is transmitted (or received) on each of N antennas, wherein at least a portion of the preamble on a first of the N antennas is delayed relative to at least the portion of the preamble on a second of the N antennas, wherein the delay is non-orthogonal amount to introduce variation across the preambles transmitted on the N transmit antennas. The legacy portion may be, for example, an 802.11a/g preamble.

The preamble can be delayed on each of the N antennas, for example, by approximately 5-10% of a symbol duration. The delay amounts can optionally be selected to maintain compatibility with one or more legacy devices. The preamble is one or more of a long preamble format or a short preamble format.

A more complete understanding of the present invention, as well as further features and advantages of the present invention, will be obtained by reference to the following detailed description and drawings.

BRIEF DESCRIPTION OF THE DRAWINGS

FIGS. 10A through 10C illustrate the HT-LTF of the preamble design of FIGS. 6 and 9 in further detail;

FIG. 15 illustrates exemplary content for illustrative high throughput signal fields (HT-SIG1 and HT-SIG2) for the long preamble format of FIG. 12.

DETAILED DESCRIPTION

Figure 1:
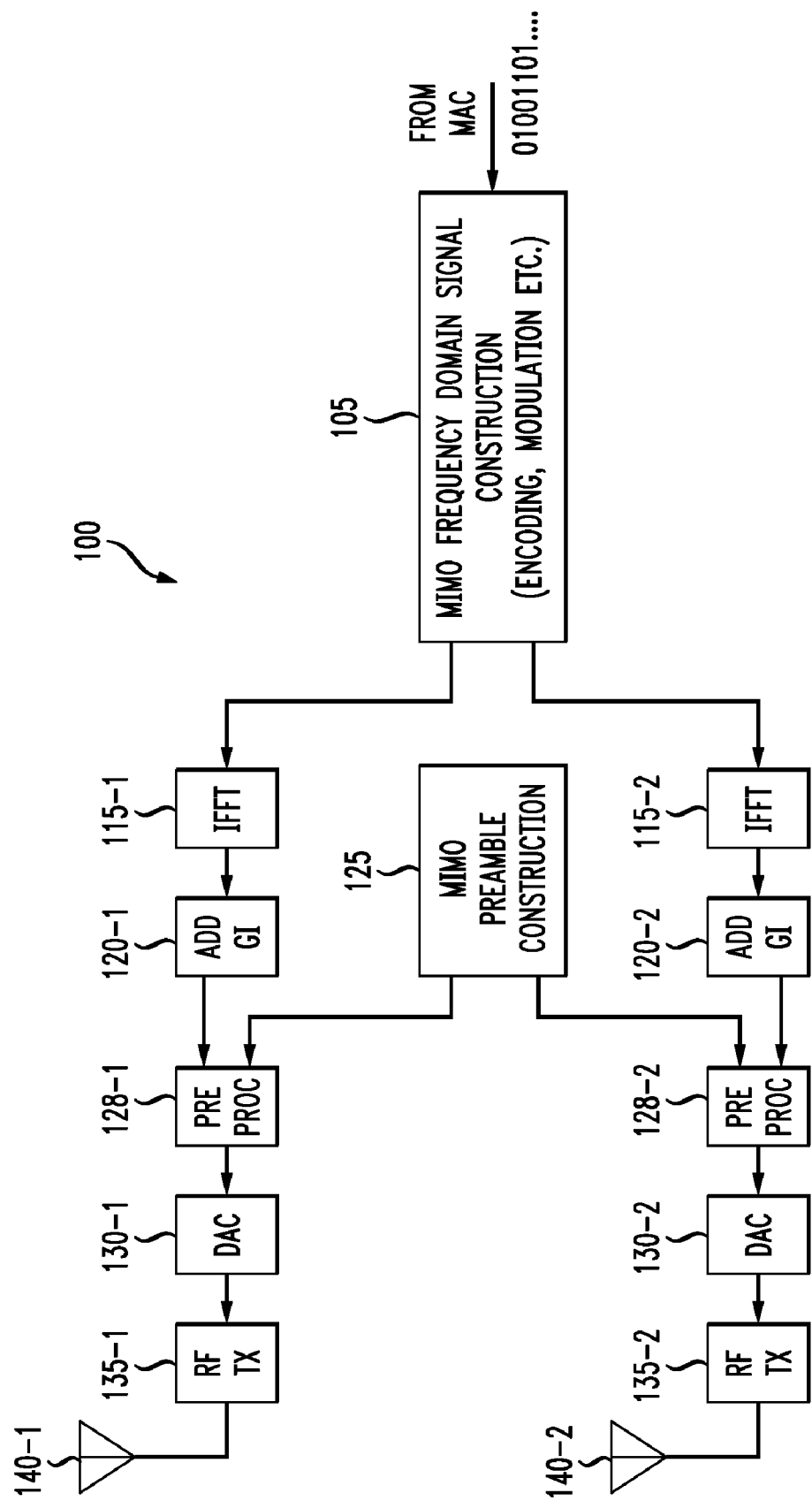
FIG. 1 is a schematic block diagram of an exemplary MIMO transmitter.

The present invention provides long and short preamble formats and techniques for preamble training for MIMO systems. FIG. 1 is a schematic block diagram of a MIMO transmitter 100. As shown in FIG. 1, the exemplary two antenna transmitter 100 encodes the information bits received from the medium access control (MAC) layer and maps the encoded bits to different frequency tones (subcarriers) at stage 105. For each transmit branch, the signal is then transformed to a time domain wave form by an IFFT (inverse fast Fourier transform) 115. A guard interval (GI) of 800 nanoseconds (ns) is added in the exemplary implementation before every OFDM symbol by stage 120 and a preamble of 32 µs is added by stage 125 to complete the packet. The digital signal is then pre-processed at stage 128 and converted to an analog signal by converter 130 before the RF stage 135 transmits the signal on a corresponding antenna 140.

Figure 2:
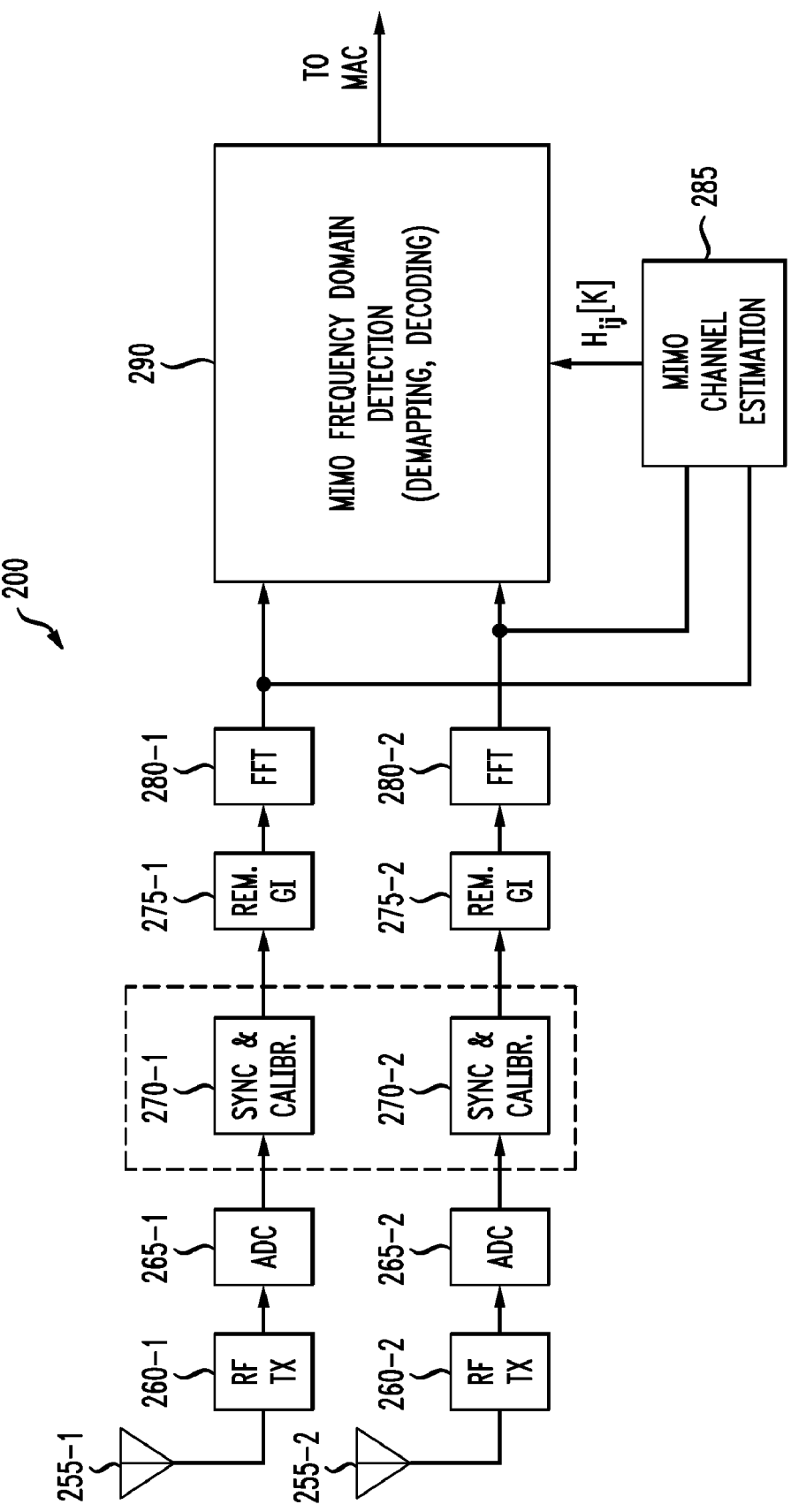
FIG. 2 is a schematic block diagram of an exemplary MIMO receiver.

FIG. 2 is a schematic block diagram of a MIMO receiver 200. As shown in FIG. 2, the exemplary two antenna receiver 200 processes the signal received on two receive antennas 255-1 and 255-2 at corresponding RF stages 260-1, 260-2. The analog signals are then converted to digital signals by corresponding converters 265. The receiver 200 processes the preamble to detect the packet, and then extracts the frequency and timing synchronization information at synchronization stage 270 for both branches. The guard interval is removed at stage 275. The signal is then transformed back to the frequency domain by an FFT at stage 280. The channel estimates are obtained at stage 285 using the long training symbol. The channel estimates are applied to the demapper/decoder 290, and the information bits are recovered.

Figure 3:
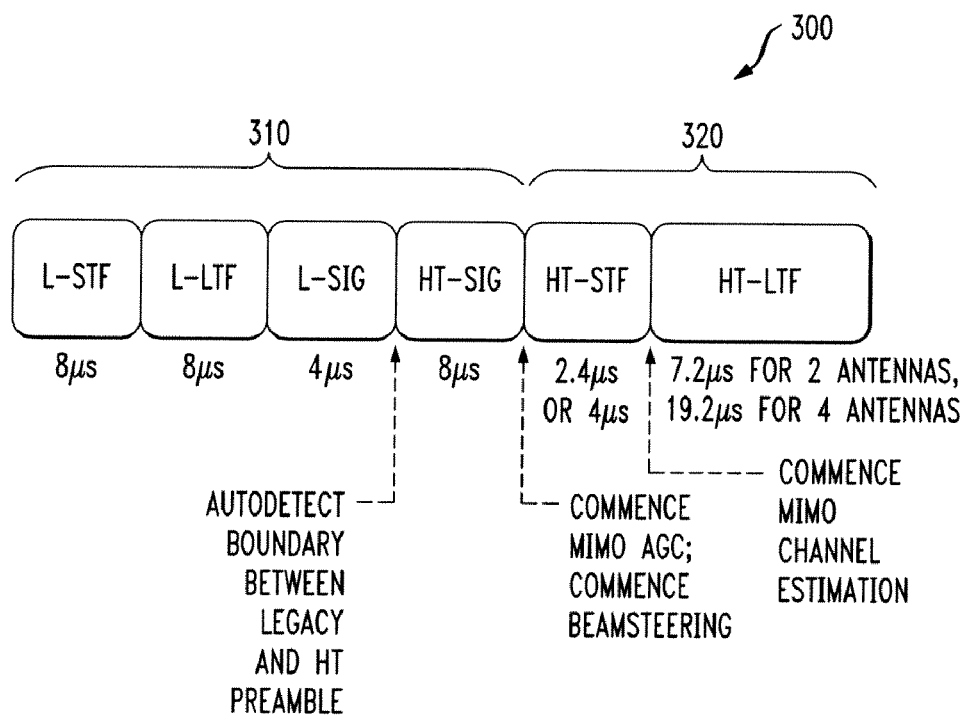
FIG. 3 illustrates a preamble design that is backwards compatible with 802.11a/g legacy devices.

FIG. 3 illustrates a long preamble design 300 that is backwards compatible with 802.11a/g legacy devices. The preamble design 300 provides a dedicated legacy portion 310 with a signal field for backward compatibility and a dedicated high throughput (HT) MIMO training portion 320 for decoding the high throughput payload. The legacy short training field (L-STF) is typically used for power estimation, coarse frequency offset estimation, and coarse time estimation. The legacy long training field (L-LTF) is used for fine time estimation and channel estimation in legacy systems. The legacy signal field (L-SIG) is used, for example, to identify the data rate at which the legacy payload has been transmitted.

Generally, as discussed further below in conjunction with FIGS. 4 and 5, the legacy portion 310 can be transmitted on a single antenna, or with CDD across the transmit antenna array. For a detailed discussion of an implementation of the preamble design of FIG. 3 and techniques for employing CDD or tone-interleaving across different transmit antennas, see, for example, U.S. patent application Ser. No. 11/043,025, filed Jan. 24, 2005, entitled "Method And Apparatus For Preamble Training In A Multiple Antenna Communication System," incorporated by reference herein.

In the exemplary preamble design 300, the transmitter 100 first transmits the legacy 802.11a/g preamble 310, for example, using CDD. The legacy preamble 310 permits the performance of packet detection and coarse frequency offset estimation. The results of these two functions are also going to be used in the MIMO transmission. In addition to these two functions, the legacy preamble 310 is used to perform legacy AGC, timing and frequency synchronization and channel estimation, in a known manner. The receiver 200 then decodes the subsequent legacy and HT signal fields. The HT signal field is also transmitted using CDD (or tone interleaving).

As shown in FIG. 3, following the legacy and HT signal fields is a MIMO short training field (HT-STF) and then the MIMO long training fields (i.e., HT-LTFs). Each field is a logical connection of OFDM symbols. The MIMO short training field (i.e., HT-STF) helps refine the AGC setting for receiving a MIMO payload. It is also at this instance that the transmitter may commence beam steering, if desired. The length of the HT-STF can be much shorter than the legacy short training field.

In an exemplary two antenna system, the HT-LTF is 7.2 µs. In an exemplary four antenna system, the HT-LTF is 19.2 µs. In an exemplary system, the HT-STF is 2.4 µs long. In another exemplary system, the HT-STF is 4.0 µs long.

The HT-STF and HT-LTF fields of FIG. 3 can be constructed in a tone-interleaved fashion, as discussed further below in conjunction with FIG. 4.

Figure 4:
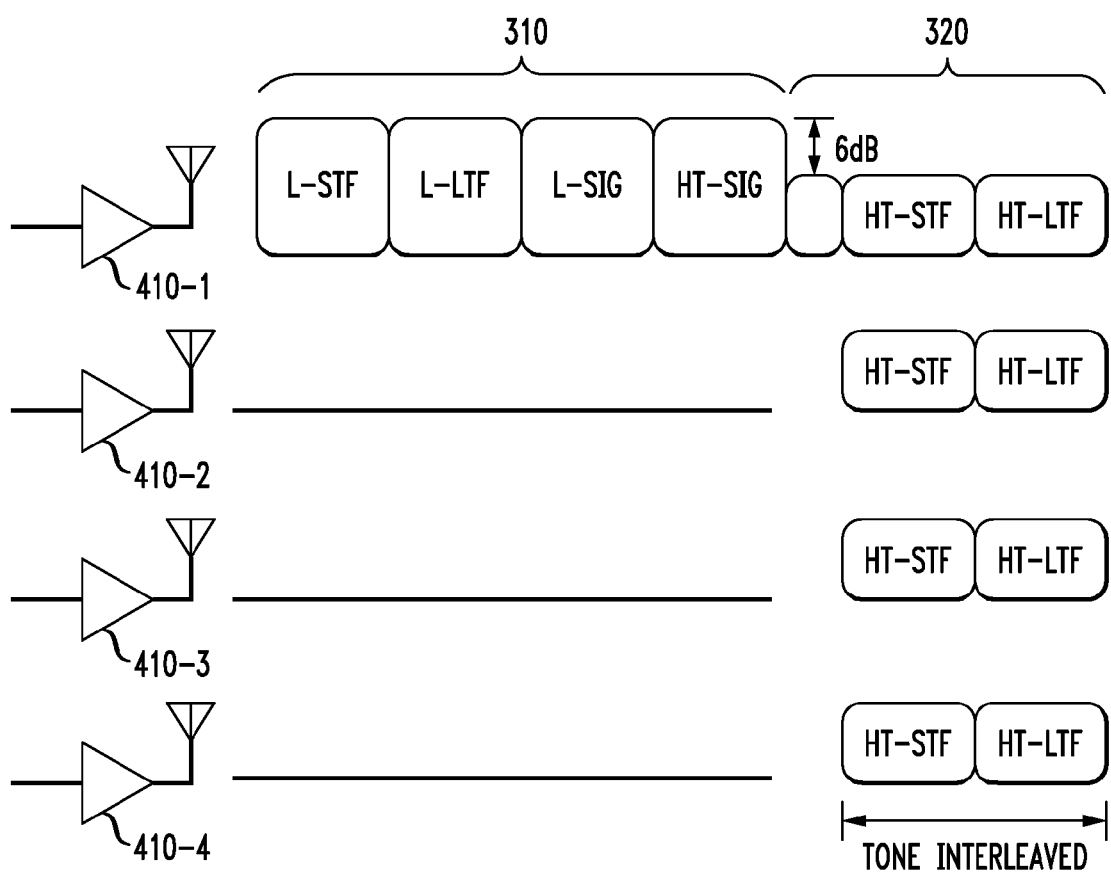
FIG. 4 illustrates a technique that transmits the legacy preamble portion on a single antenna, and transmits the high throughput preamble portion in a tone-interleaving fashion across different transmit antennas.

FIG. 4 illustrates a technique whereby the legacy portion of the preamble is transmitted on a single antenna, and the high throughput portion of the preamble is transmitted in a tone-interleaving fashion across different transmit antennas. As shown in FIG. 4, the legacy portion 310 is initially transmitted by first transmitter 410-1 in the MIMO system. Thereafter, in one exemplary embodiment shown in FIG. 4, the high throughput training portion 320 is transmitted by each antenna 410-1 through 410-4 at a reduced power, such as a reduction of 6 dB, relative to the legacy portion 310, using tone interleaving. Generally, for tone interleaving, different tones of the high throughput training portion 320 are transmitted on different transmit antennas, such that a subcarrier (tone) is active on only one transmit branch 410 at a time.

The tone interleaving embodiment shown in FIG. 4 is backwards compatible with legacy devices. If the transmitter is power amplifier limited, the range may be compromised. In addition, even if the transmitter is not power amplifier limited, there will be a 6 dB power ramp, which will require introduction of a guard time prior to the HT-STF else it would degrade the performance of the HT-STF.

Figure 5:
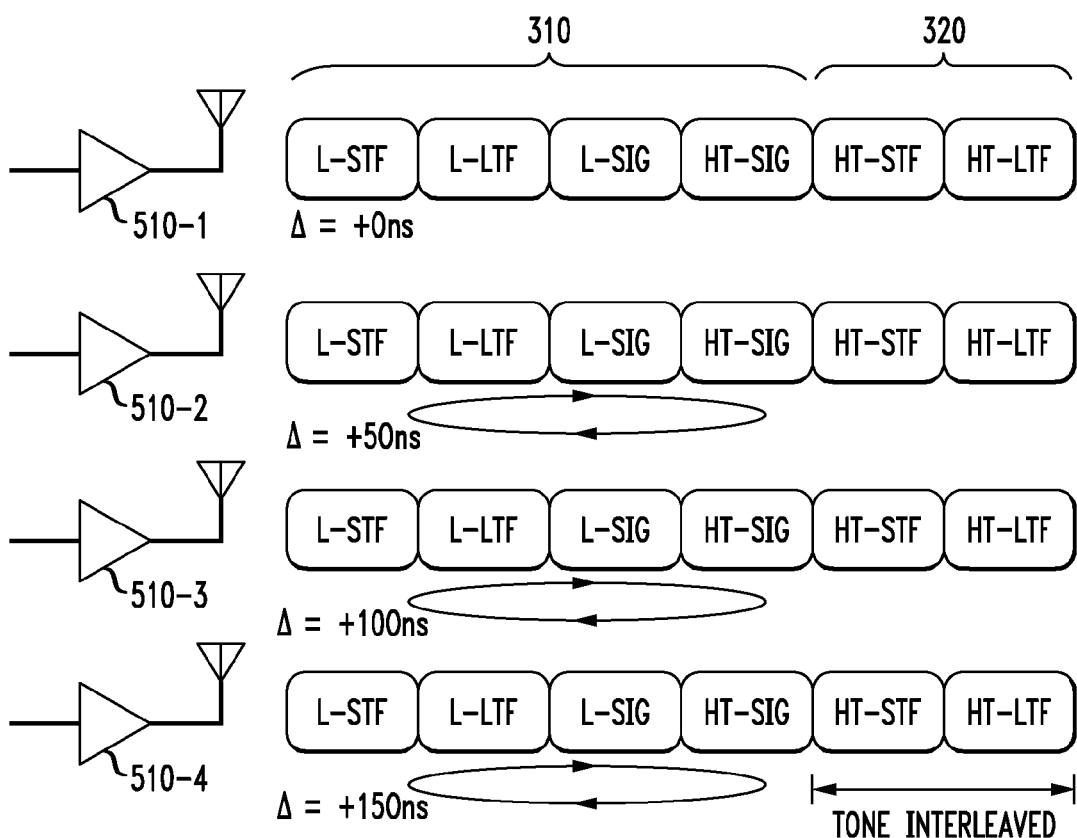
FIG. 5 illustrates a technique for CDD transmission of the legacy portion of the preamble of FIG. 3, with tone-interleaving across different transmit antennas for the high throughput training portion.

FIG. 5 illustrates a technique for CDD transmission of the legacy portion 310, with tone-interleaving across different transmit antennas for the high throughput training portion 320. As shown in FIG. 5, the legacy portion 310 is transmitted across each transmit branch 510 with CDD. Generally, a signal is transmitted with CDD by putting the last A samples of the OFDM symbol to the beginning. As shown in FIG. 5, each different antenna has a different cyclic delay. The high throughput training portion 320 is transmitted by each antenna 510-1 through 510-4 at full power, using tone interleaving.

The CDD embodiment shown in FIG. 5 does not demonstrate a power jump, and no power amplifier switching is required. The CDD embodiment shown in FIG. 5 is not limited by the power amplifier design. The CDD values are intended to introduce randomization (as opposed to orthogonality with a cyclic delay equal to ½ the OFDM symbol length) and the values are generally on the order of 5-10% of the OFDM symbol duration which is 800 ns long. The CDD values, however, have to be chosen such that legacy compatibility is not compromised. The purpose of using the CDD technique is to mitigate unintended power variations in the far field.

Figure 6:
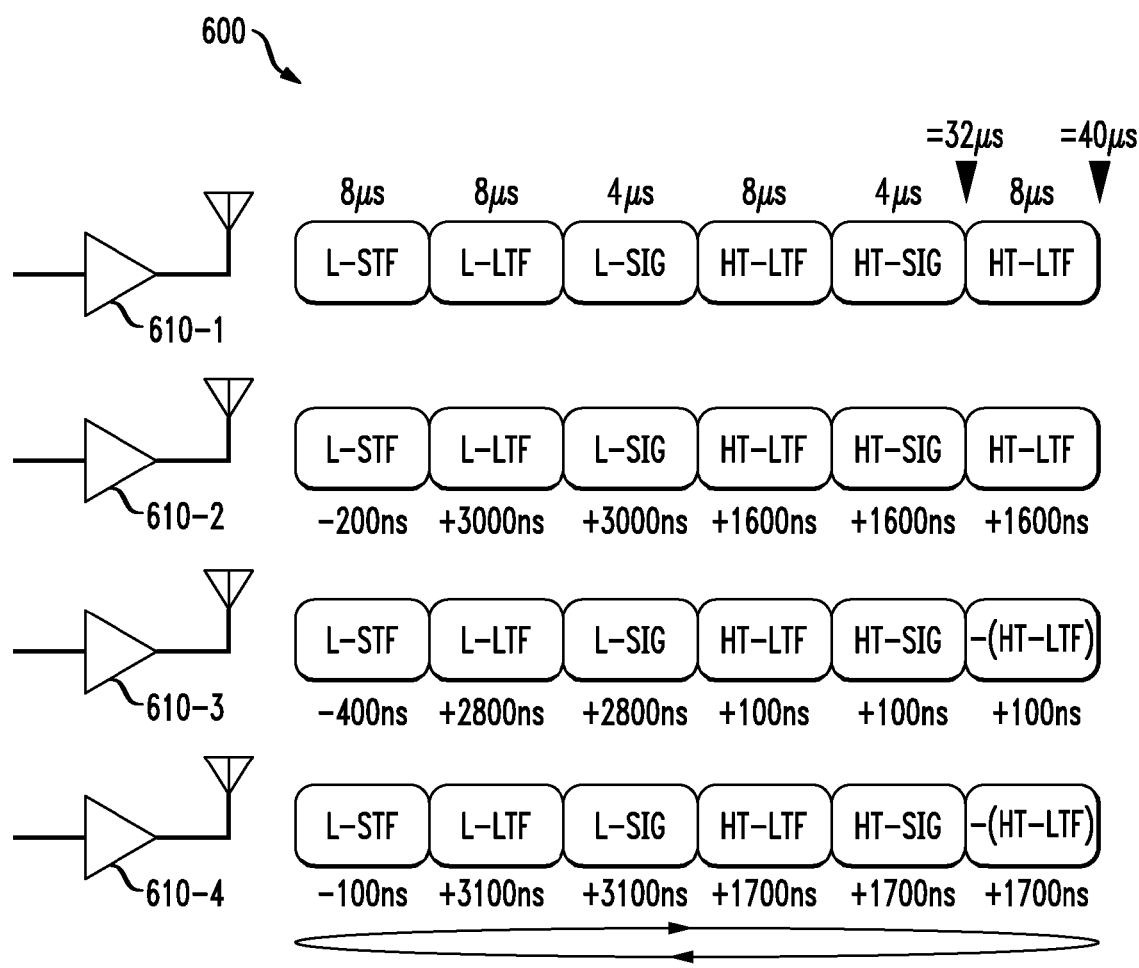
FIG. 6 illustrates an alternative existing long preamble design, as proposed by the World-Wide Spectrum Efficiency (WWiSE) alliance.

FIG. 6 illustrates an alternative existing long preamble design 600, as proposed by the World-Wide Spectrum Efficiency (WWiSE) alliance. WWiSE is an alliance of companies developing a proposal for the IEEE 802.11n Wireless LAN standard. Generally, the preamble design 600 is said to use ½ symbol long cyclic delays (CDD) across the HT-LTF, as shown in FIG. 6, to maintain orthogonality among the preambles on the various transmit branches 610. The "reserved bit" in the L-SIG field can be used to indicate a HT transmission.

Figure 7:
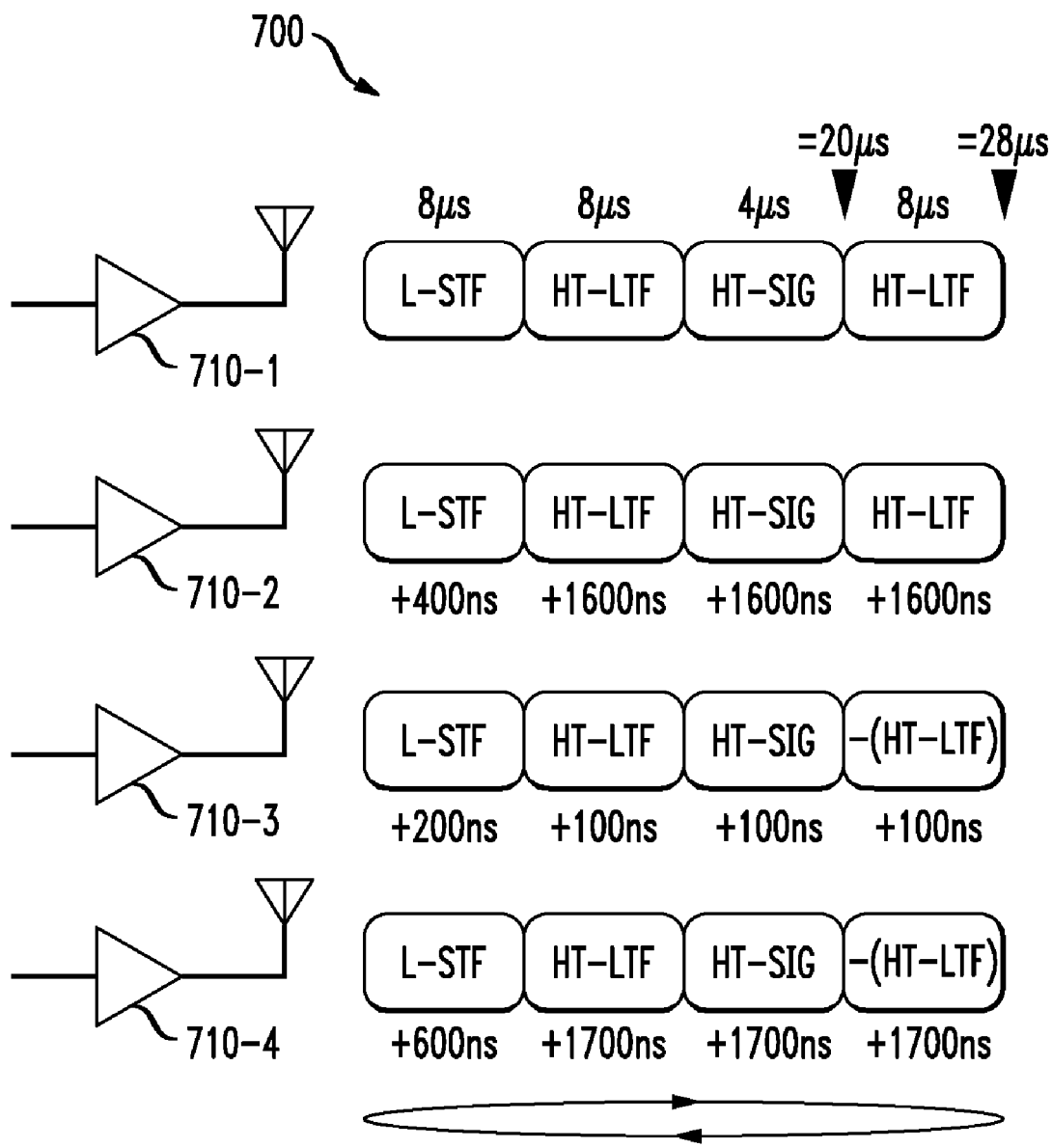
FIG. 7 illustrates an existing short preamble design, as proposed by the WWiSE alliance.

FIG. 7 illustrates an existing short preamble design 700, as proposed by the WWiSE alliance. The short preamble design 700 can be employed if there are no legacy devices present, backwards compatibility is not otherwise required or a more efficient preamble is desired. As shown in FIG. 7, the short preamble design 700 comprises a legacy short training field, immediately followed by the high throughput portions of the design 600. In other words, the legacy long training and legacy signal fields are not part of the design 700. Again, as shown in FIG. 7, relatively large delay values (equivalent to ½ symbol lengths) are employed in the HT-LTF to distinguish the long training fields on each antenna 710.

The preamble 700 comprises two high throughput long training fields, that are sufficient to distinguish four transmit branches 710, when used with CDD and orthogonal precode mapping. In other words, for the exemplary design 700 of FIG. 7, ½ symbol cyclic shifts are used to resolve two spatial streams 710, and Walsh encoding can be used to resolve two additional spatial streams 710.

If the long preamble formats 300, 600 of FIGS. 3 and 6 are compared, it is apparent that the field allocations of the long preamble formats 300, 600 are substantially similar, other than the fourth and fifth fields. In particular, the positions of the high throughput signal fields (i.e., HT-SIG) are alternated in the two formats 300, 600, and the format 300 employs a HT-STF in the fifth position, while the format 600 employs an additional HT-LTF in the fourth position.

Figure 8:
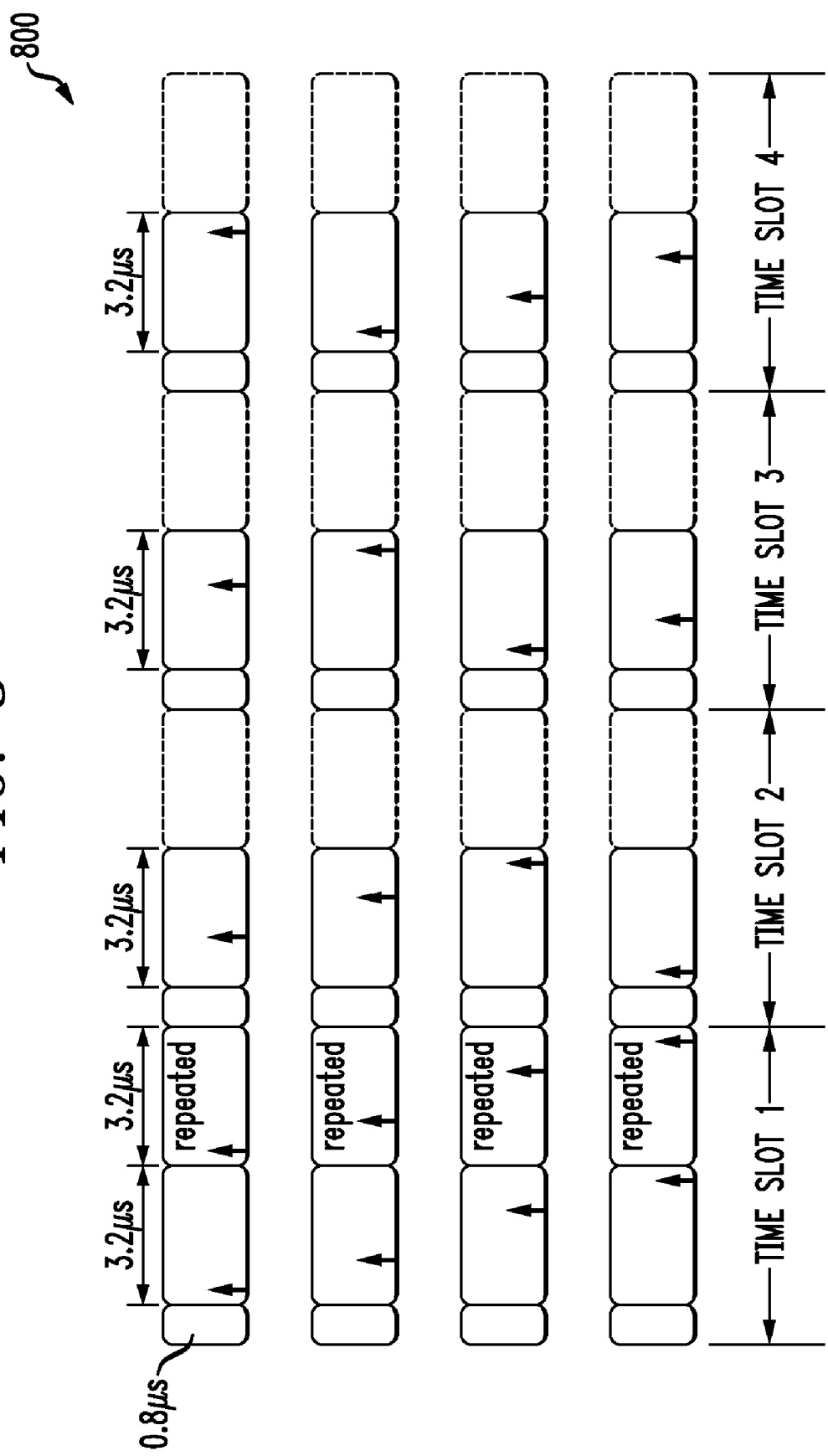
FIG. 8 illustrates the high throughput long training field (HT-LTF) of the preamble design of FIG. 3 in further detail.

FIG. 8 illustrates the HT-LTF of the preamble design 300 of FIG. 3 in further detail. As shown in FIG. 8, the first time slot of the HT-LTF contains a repeated long training symbol and each subsequent time slot contains only one long training symbol. In addition, as indicated above, all spatial streams are distinguished via tone interleaving. Thus, no smoothing is required. The length of the HT-LTF for four spatial streams is {(4*0.8)+(5*3.2)} or 19.2 μs. If the LTF is not repeated in the first time slot, then the overall length (duration) of the HT-LTF of FIG. 8 becomes 16 μs.

Figure 9:
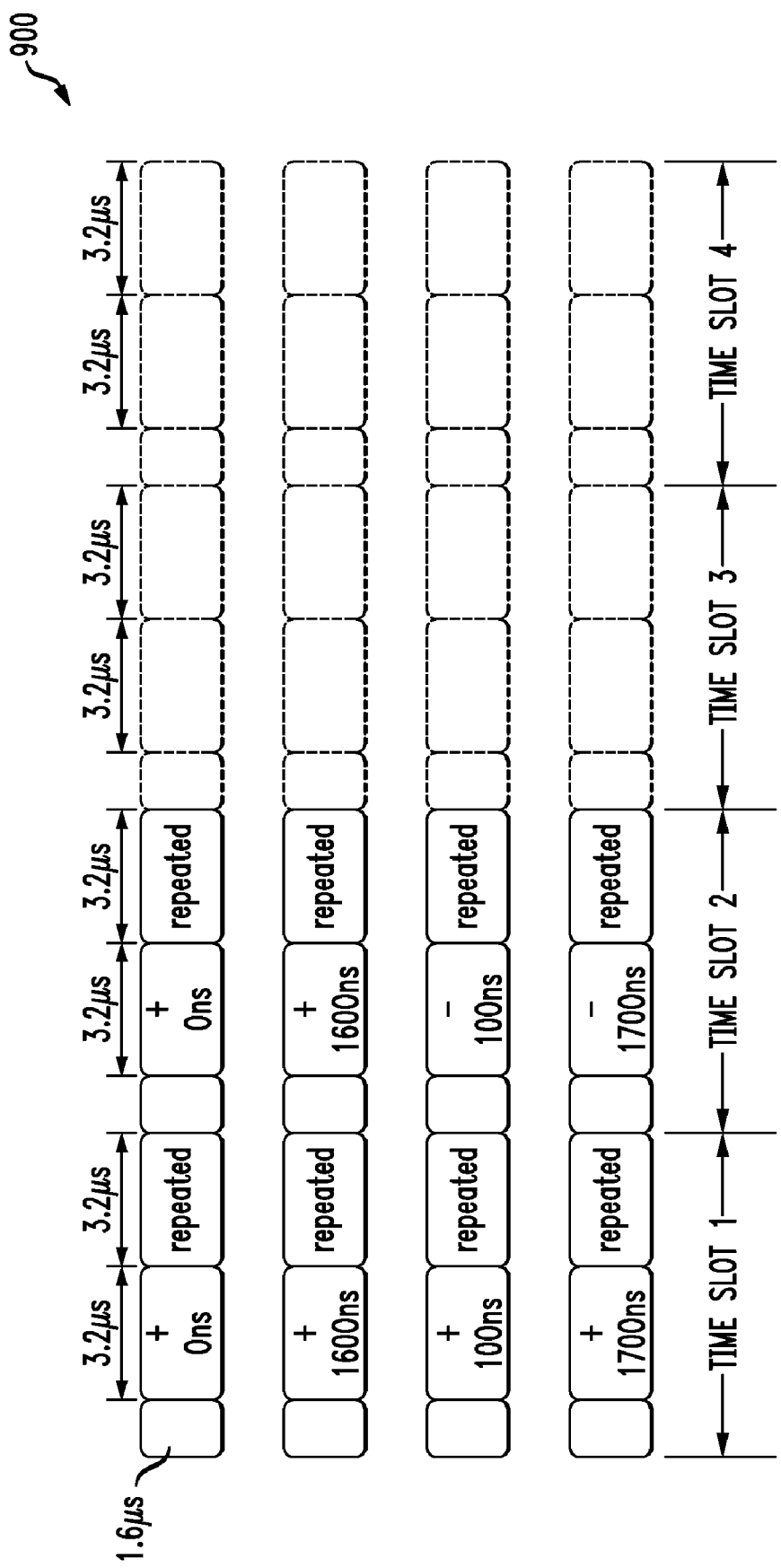
FIG. 9 illustrates the HT-LTF of the preamble design of FIG. 6 in further detail.

FIG. 9 illustrates the HT-LTF 900 of the preamble design 600 of FIG. 6 in further detail. As shown in FIG. 9, each time slot of the HT-LTF contains a repeated long training symbol. Thus, additional estimation of fine frequency offset (FO) is possible. For a two transmit antenna system, orthogonality is maintained via a ½ symbol shift (using the CDD delay amounts shown in FIG. 9). For the next two spatial streams in a four transmit antenna system, orthogonality is achieved via a 2×2 Walsh encoding matrix (using the polarities "++" and "+−" across two time slots, as shown in FIG. 9). For example, the first spatial stream is distinguished from the second spatial stream by the ½ cyclic delay, and the first spatial stream is distinguished from the third spatial stream by Walsh encoding across the two time slots. Since only two time slots are employed, two Walsh codes are available, and two spatial streams can be distinguished.

In the four transmit antenna implementation, two time slots are required to estimate the four spatial streams. It has been observed that smoothing is problematic if beam steering is performed at the transmitter. The length of the HT-LTF of FIG. 9 is 16 μs.

Figure 10A:
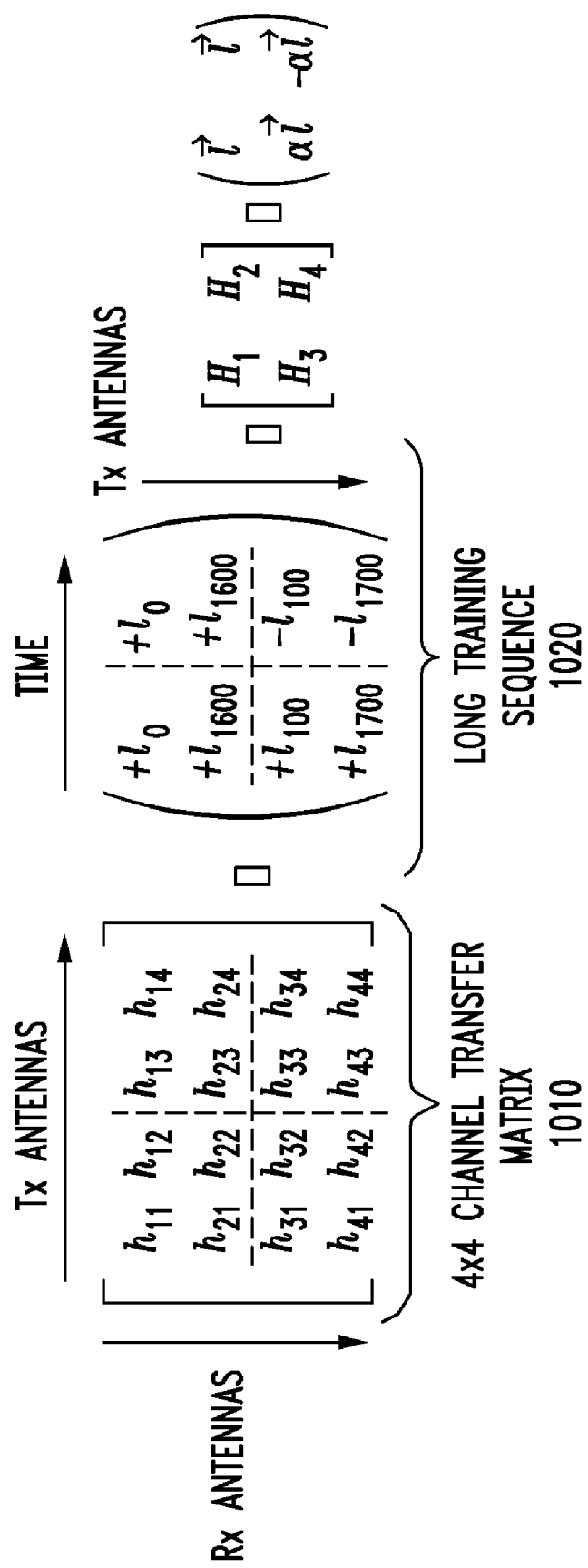

FIGS. 10A through 10C illustrate the HT-LTF of the preamble design 600 of FIGS. 6 and 9 in further detail. FIG. 10A illustrates the 4×4 channel transfer matrix 1010 for a four transmit and receive antenna implementation. In addition, FIG. 10A illustrates the corresponding long training sequence 1020, based on the inverse Walsh matrix and CDD delay values shown in FIG. 9.

As shown in FIG. 10B, the first step is to extract the block vectors via Walsh processing. The received signal is characterized in matrix form 1030 and the inverse Walsh matrix 1040 for the ½ cyclic delay is applied at the receiver. Finally, as shown in FIG. 10C, the channel, h(t), is extracted via cross-correlation with the ½ shifted and non-shifted HT-LTFs.

Long Preamble Format

Figure 11:
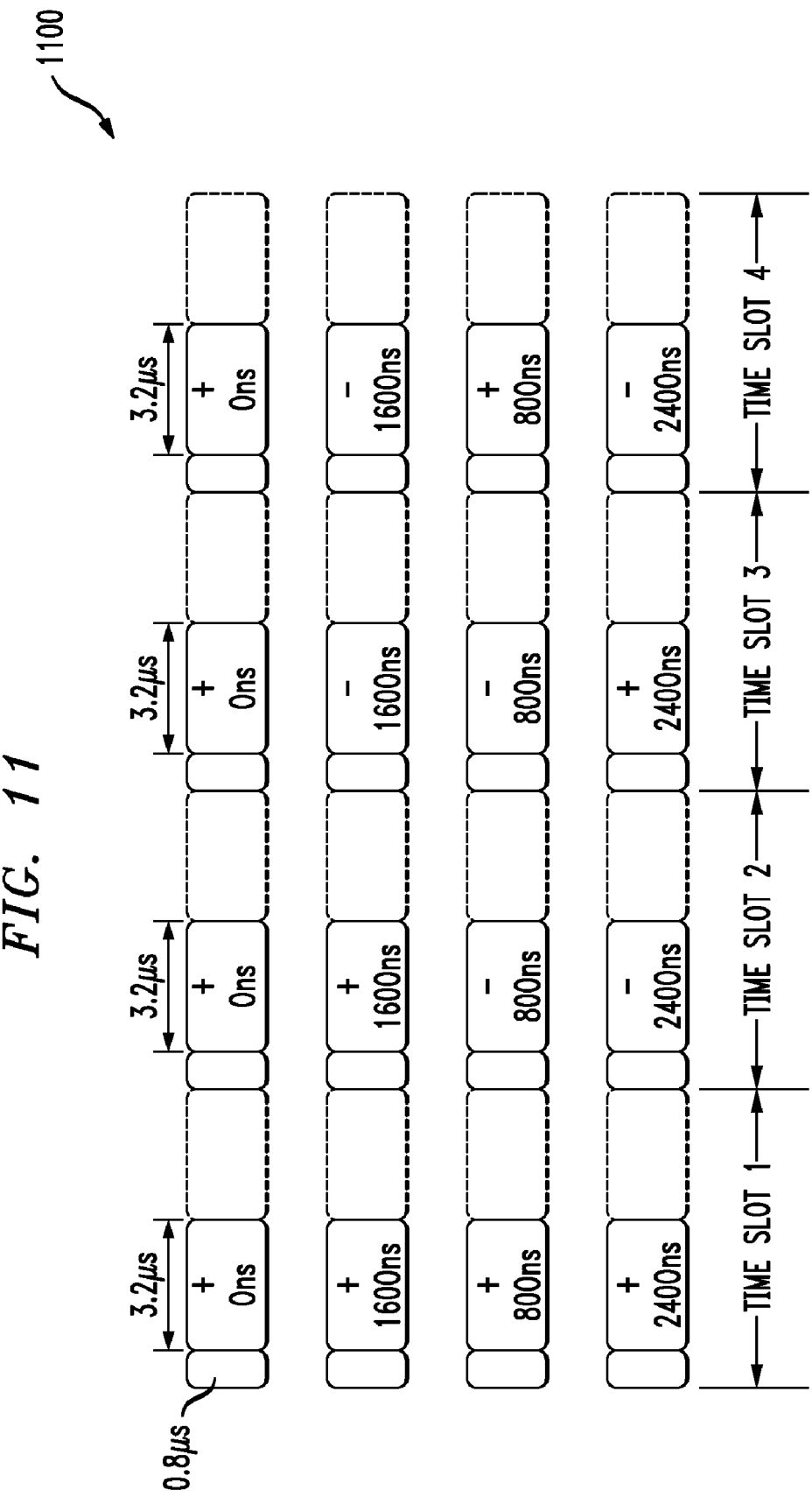
FIG. 11 illustrates a HT-LTF incorporating features of the present invention.

FIG. 11 illustrates a HT-LTF 1100 incorporating features of the present invention. As shown in FIG. 11, the HT-LTF 1100 employs one time slot per spatial stream (transmit branch). For example, in a four antenna system, four time slots are employed and a 4×4 Walsh matrix is available to fully distinguish the four spatial streams. Thus, cross correlation with HT-LTFs is not required. In addition, the HT-LTF 1100 does not repeat the long training symbol in each time slot. Nonetheless, the frequency offset (FO) estimation can still be performed off of the legacy long training field. The CDD values shown in FIG. 11 are chosen to introduce randomization among the preamble and thereby reduce the power fluctuation. The exemplary delay values correspond to 0, ½, ¼ and ¾ cyclic delay values. Again, these delay values are not large enough to provide orthogonality but are intended to randomize the deterministic preamble.

Since the OFDM symbol is not repeated in each time slot, the length of the HT-LTF 1100 for four spatial streams is (4*0.8)+(4*3.2) or 16 μs. If the OFDM symbol is repeated in each time slot, the system is more robust, since two symbols with twice the energy are available to improve the estimation (at the expense of longer preambles).

The four spatial streams in FIG. 11 are separated using Walsh Coding (and CDD), as opposed to tone interleaving. In an implementation employing three spatial streams, a Fourier matrix can be employed since a corresponding Walsh matrix is not known to exist.

Figure 12:
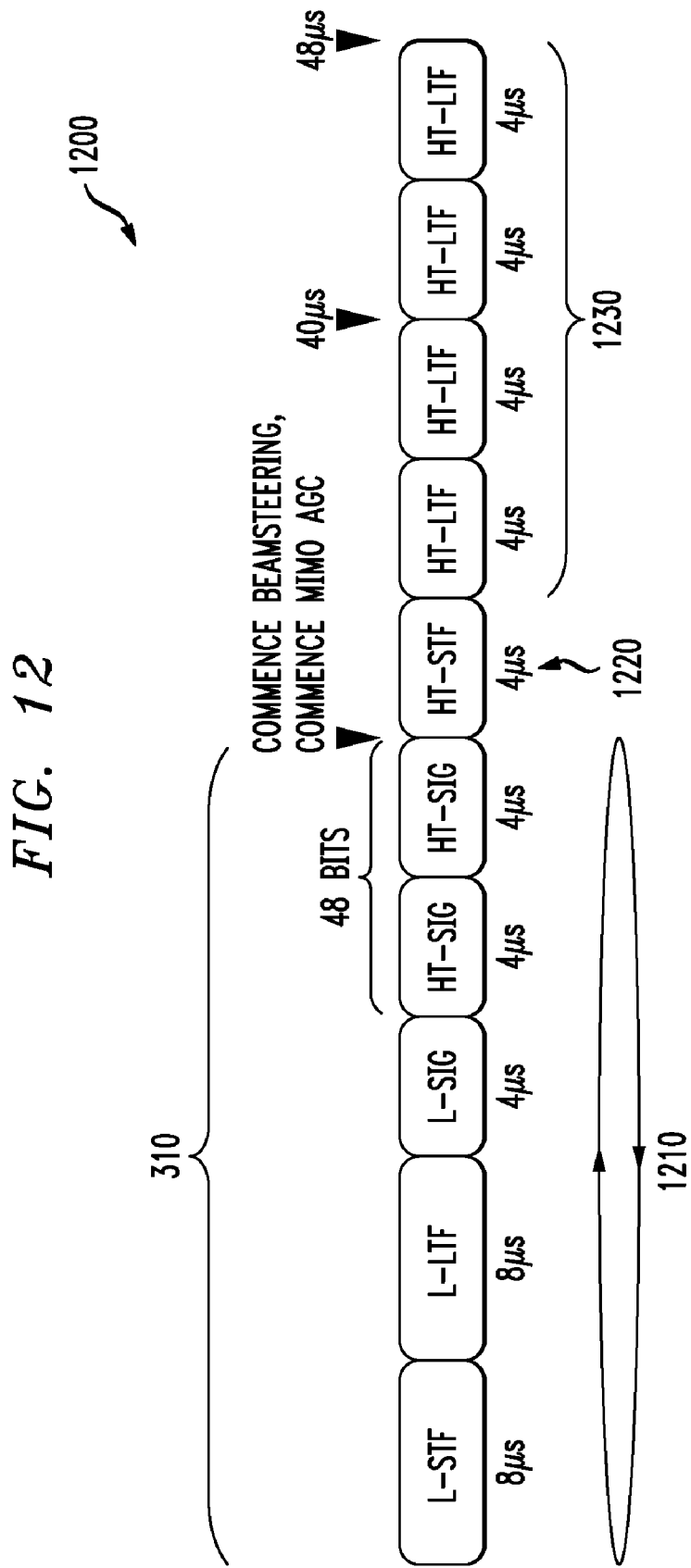
FIG. 12 illustrates a long preamble format including the HT-LTF of FIG. 11.

FIG. 12 illustrates a long preamble format 1200 including the HT-LTF 1100 of FIG. 11. As shown in FIG. 12, the legacy portion 310 employs CDD encoding for randomization purposes.

In addition, the long preamble format 1200 includes a HT-STF that is transmitted using tone interleaving 1220 across the antenna array. Finally, the HT-LTFs are transmitted using Orthogonal Coding 1230. For example, full Walsh coding can be employed for two and four spatial streams, and Fourier coding can be employed for three spatial streams. It is noted that the long preamble format 1200 provides a HT-LTF for each transmit antenna, and ignores the legacy LTF.

Short Preamble Format

As discussed above in conjunction with FIG. 7, the WWiSE alliance proposed a short preamble design 700. As shown in FIG. 7, a first HT-LTF is used for two spatial streams and a second HT-LTF is appended for three or four streams. Thus, the two high throughput long training fields are sufficient to distinguish four transmit branches 710, when used with ½ symbol length CDD and orthogonal precode mapping. In one exemplary design 700, ½ symbol cyclic shifts are used to resolve two spatial streams 710, and Walsh encoding can be used to resolve two additional spatial streams 710. Beam steering cannot be employed, since the HT-LTFs require smoothing, i.e., cross-correlation with HT-LTFs.

Figure 13:
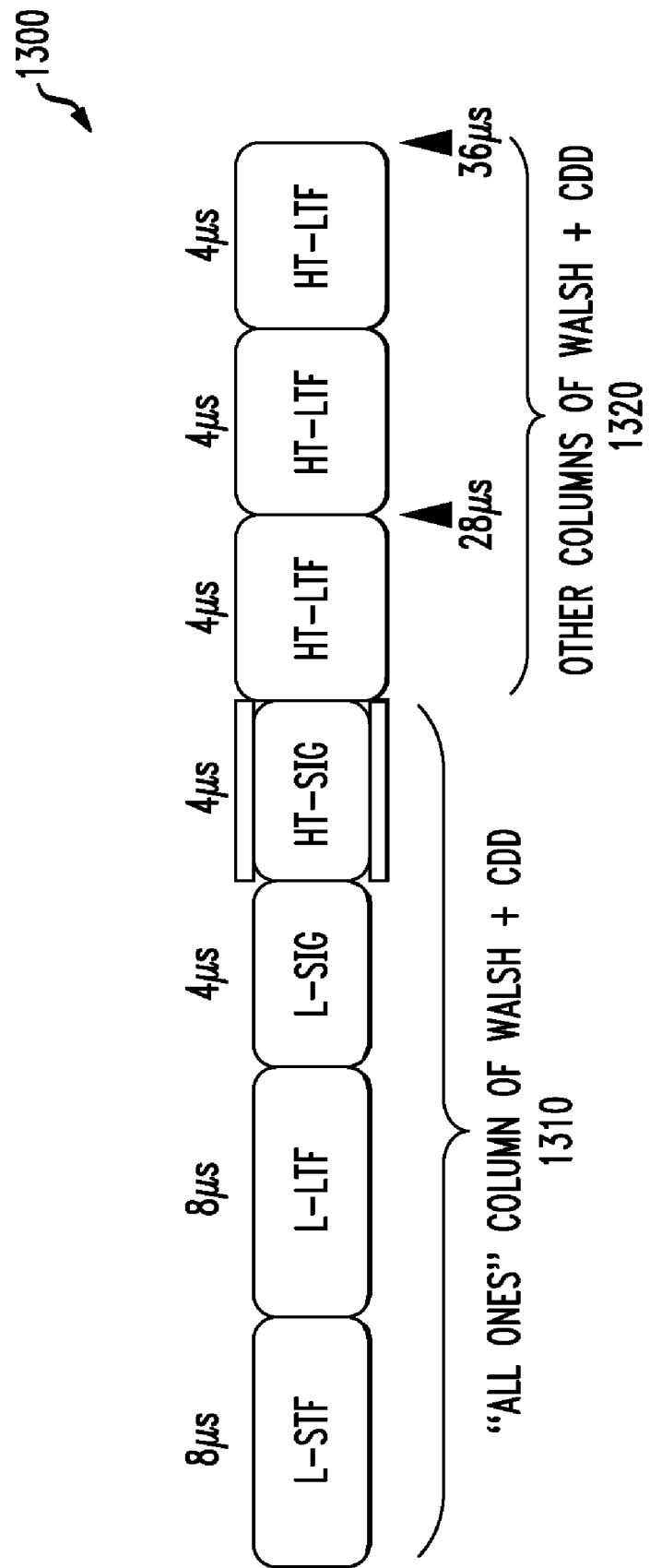
FIG. 13 illustrates a short preamble format incorporating features of the present invention for an exemplary four antenna system.

FIG. 13 illustrates a short preamble format 1300 incorporating features of the present invention for an exemplary four antenna system. Among other features, the short preamble format 1300 incorporates a legacy preamble having a legacy STF, LTF and signal field. The short preamble format 1300 is thus backwards compatible and can operate in a mixed mode environment (comprised of legacy and MIMO devices).

As shown in FIG. 13, and discussed further below in conjunction with FIG. 14, a first portion 1310 of the short preamble format 1300 is transmitted using the first, "all ones" column of the Walsh matrix and CDD, and a second portion 1320 of the short preamble format 1300 is transmitted using the remaining columns (columns 2-4 for a four antenna system) of the Walsh matrix and CDD. The first portion 1310 includes the legacy portion and is modulated by a "+" Walsh code. Thus, a legacy device can recognize the legacy preamble to maintain backwards compatibility. The Walsh encoding provides full orthogonality for the LTF fields to permit separation of the spatial streams. In addition, the full Walsh encoding permits beam steering, particularly under a MAC cover. The CDD delays are meant to introduce randomization into the preamble to reduce power fluctuation.

The high throughput signal field HT-SIG can be transmitted with two or four extra sub-carriers being active (for example, using 54 or 56 of the 64 available subcarriers). The duration of the exemplary short preamble format 1300 exceeds the duration of the short preamble format 700 by 8 us. This extra 8 us, however, considerably increases the utility of the short preamble, for example, by including the 4 us L-SIG field that allows the format 1300 to be backwards compatible. Generally, the CDD values should be chosen to meet legacy interoperability requirements. In addition, the presence of the legacy long training field allows an estimation of the high throughput channel.

In addition, while the long preamble format 1200 of FIG. 12 employs a HT-LTF for each transmit antenna, and ignores the legacy LTF, the short preamble format 1300 employs the L-LTF as well as N−1 high throughput long training fields for an N antenna system. Generally, the long training fields are used for MIMO channel estimation.

Figure 14:
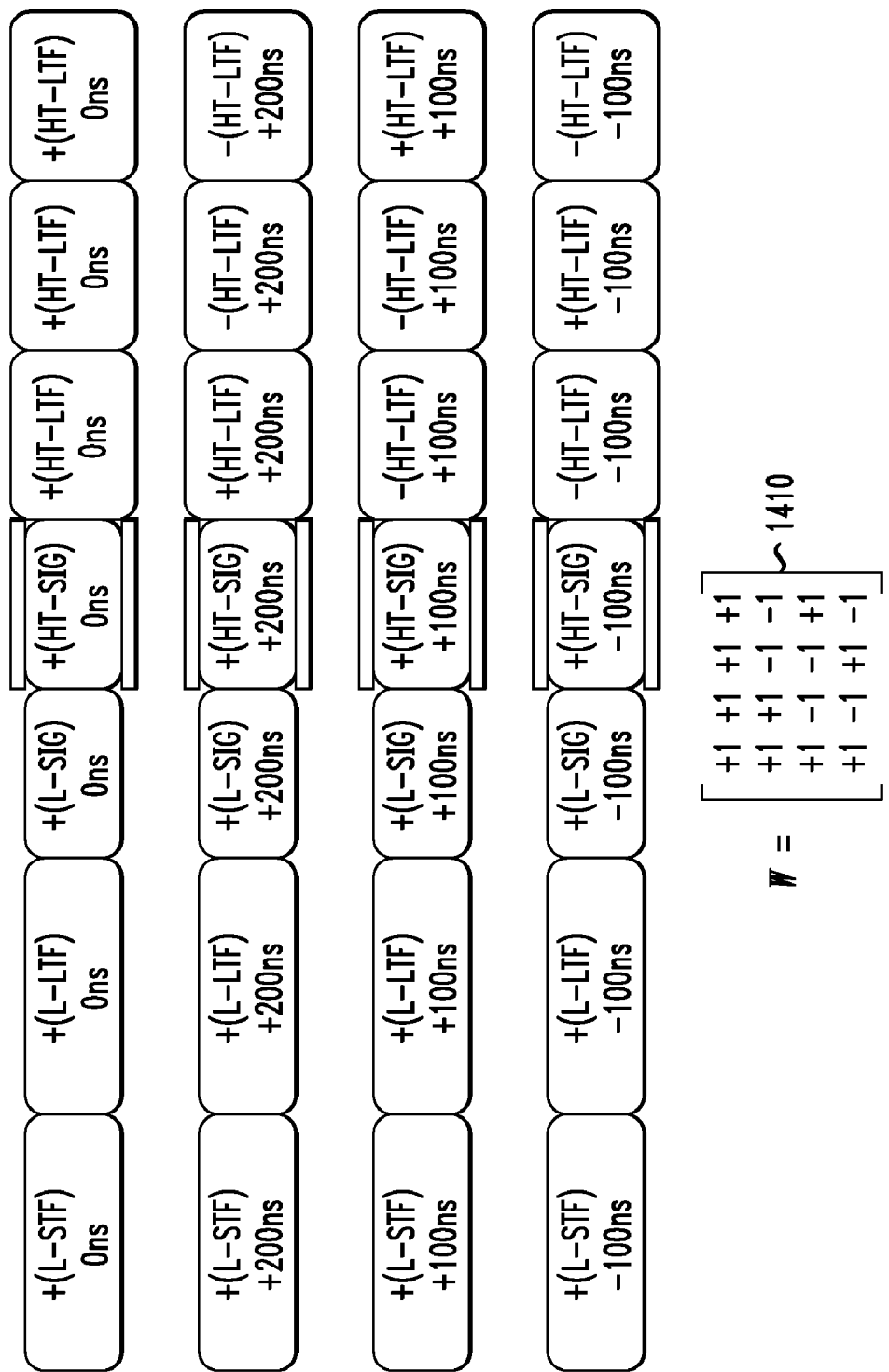
FIG. 14 illustrates an exemplary technique for transmission of the short preamble format of FIG. 13.

FIG. 14 illustrates an exemplary technique 1400 for transmission of the short preamble format 1300 of FIG. 13. The Walsh codes 1410 and CDD delays employed to distinguish each spatial stream are shown in FIG. 14. The smaller CDD delays (relative to the design 700), make the format 1300 compatible with legacy devices and are intended to introduce randomization among the preamble. The full Walsh encoding in accordance with the matrix 1410 ensures that orthogonality is maintained.

FIG. 15 illustrates exemplary content for illustrative high throughput signal fields (HT-SIG1 and HT-SIG2) for the long preamble format 1200 of FIG. 12. For each bit in the signal fields, the corresponding assignment is shown in the tables.

Figure 16:
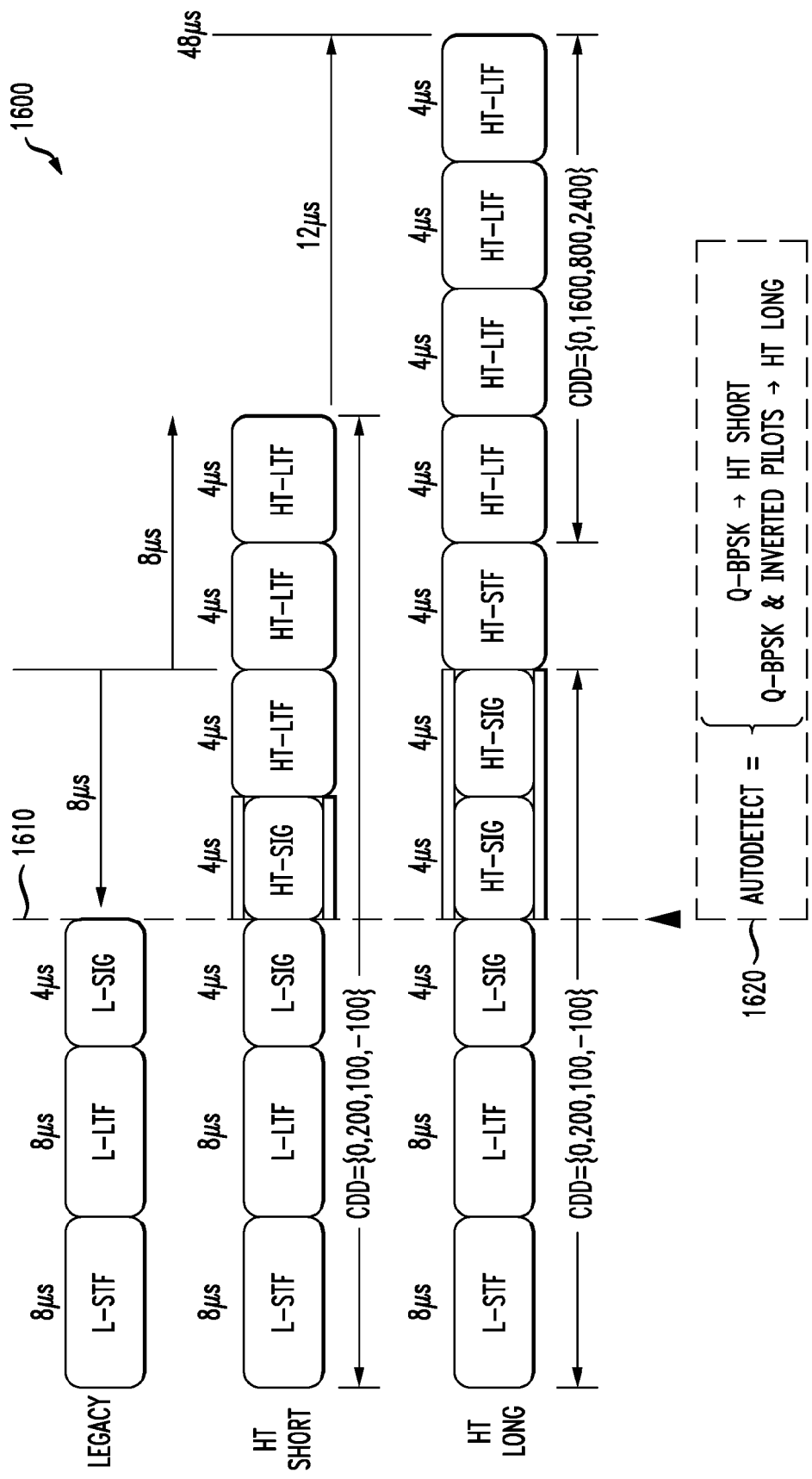
FIG. 16 illustrates an exemplary technique for autodetection of the long and short preambles disclosed herein.

When a HT device is receiving a transmission with a mixed mode preamble, it has no apriori knowledge if the transmission is a legacy or high throughput transmission. Therefore, a mechanism is needed for the HT device to automatically detect the presence of absence of a HT portion of the preamble. FIG. 16 illustrates an exemplary technique for auto-detection of the long and short preambles disclosed herein. As shown in FIG. 16, the decision is performed at a boundary 1610, using conditions 1620 based on Q-BPSK and inverted pilots. All three preamble formats discussed herein (legacy, HT short, and HT long) are identical until boundary 1610. There are several techniques to signal the continuation of the preamble. For example, the HT-SIG constellation can be rotated by 90 degrees. This technique is called Q-BPSK. In addition, the polarity of the pilots can be inverted in going from the L-SIG field to the HT-SIG field. This technique is called inverted pilots. If only Q-BPSK is used, this signals the presence of a HT short preamble. If both Q-BPSK and inverted pilots are used, this signals the presence of a HT long preamble.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

I claim:

1. A method for transmitting data in a multiple antenna communication system having N transmit antennas, said method comprising the step of:

transmitting a preamble having a legacy portion and a high throughput portion on each of said N transmit antennas, wherein a transmission of at least a portion of said preamble on a first of said N antennas is delayed relative to a transmission of said at least said portion of said preamble on a second of said N antennas, wherein said delay is a non-orthogonal amount to introduce variation across said preambles transmitted on said N transmit antennas.

2. The method of claim 1, wherein said legacy portion is an 802.11 a/g preamble.

3. The method of claim 1, wherein said preamble transmission on each of said N transmit antennas is delayed by approximately 5-10% of a symbol duration.

4. The method of claim 1, wherein said delay amounts are selected to maintain compatibility with one or more legacy devices.

5. The method of claim 1, wherein said preamble is one or more of a long preamble format or a short preamble format.

6. A multiple antenna communication system, comprising:

N transmit antennas for transmitting a preamble having a legacy portion and a high throughput portion, wherein a transmission of at least a portion of said preamble on a first of said N antennas is delayed relative to a transmission of said at least said portion of said preamble on a second of said N antennas, wherein said delay is a non-orthogonal amount to introduce variation across said preambles transmitted on said N transmit antennas.

7. The multiple antenna communication system of claim 6, wherein said legacy portion is an 802.11 a/g preamble.

8. The multiple antenna communication system of claim 6, wherein said preamble transmission on each of said N transmit antennas is delayed by approximately 5-10% of a symbol duration.

9. The multiple antenna communication system of claim 6, wherein said delay amounts are selected to maintain compatibility with one or more legacy devices.

10. The multiple antenna communication system of claim 6, wherein said preamble is one or more of a long preamble format or a short preamble format.

11. A method for receiving data in a multiple antenna communication system having N antennas, said method comprising the step of:

receiving a preamble having a legacy portion and a high throughput portion on each of said N transmit antennas, wherein a received portion of said preamble on a first of said N antennas is delayed relative to a received portion of said preamble on a second of said N antennas, wherein said delay is a non-orthogonal amount to introduce variation across said preambles transmitted on said N transmit antennas.

12. The method of claim 11, wherein said legacy portion is an 802.11 a/g preamble.

13. The method of claim 11, wherein said preamble reception on each of said N antennas is delayed by approximately 5-10% of a symbol duration.

14. The method of claim 11, wherein said delay amounts are selected to maintain compatibility with one or more legacy devices.

15. The method of claim 11, wherein said preamble is one or more of a long preamble format or a short preamble format.

16. A multiple antenna communication system, comprising:

N receive antennas for receiving a preamble having a legacy portion and a high throughput portion, wherein a received portion of said preamble on a first of said N antennas is delayed relative to a received portion of said preamble on a second of said N antennas, wherein said delay is a non-orthogonal amount to introduce variation across said preambles transmitted on said N transmit antennas.

17. The multiple antenna communication system of claim 16, wherein said legacy portion is an 802.11 a/g preamble.

18. The multiple antenna communication system of claim 16, wherein said preamble reception on each of said N receive antennas is delayed by approximately 5-10% of a symbol duration.

19. The multiple antenna communication system of claim 16, wherein said delay amounts are selected to maintain compatibility with one or more legacy devices.

20. The multiple antenna communication system of claim 16, wherein said preamble is one or more of a long preamble format or a short preamble format.

* * * * *